United States Patent Office 2,993,067
Patented July 18, 1961

2,993,067
PHOSPHONATES, ACID DERIVATIVES THEREOF AND THEIR SALTS
Barney J. Magerlein and Fred Kagan, Kalamazoo, Mich., assignors to The Upjohn Company, Kalamazoo, Mich., a corporation of Delaware
No Drawing. Filed May 29, 1959, Ser. No. 816,733
7 Claims. (Cl. 260—461)

This invention relates to novel phosphonates and processes for their preparation and is more particularly concerned with novel 2-(2,4-dihydroxyalkanoylamido)ethylphosphonic acids and with the salts and esters thereof. The novel compounds of the invention are selected from the class consisting of (a) compounds having the formula:

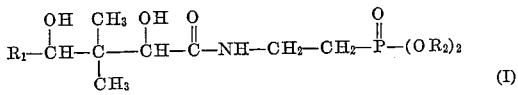

(I)

wherein $R_1$ is selected from the class consisting of hydrogen and methyl, and $R_2$ is selected from the class consisting of hydrogen, lower-alkyl, lower-alkenyl, lower-aralkyl and lower-aryl, and (b) the alkali metal and alkaline earth metal salts of compounds having the above Formula I in which $R_2$ represents hydrogen.

The term "lower-alkyl" as used throughout the specification and claims means an alkyl radical containing from 1 to 6 carbon atoms, inclusive, such as methyl, ethyl, propyl, butyl, amyl, hexyl and isomeric forms thereof. The term "lower-alkenyl" as used throughout the specification and claims means an alkenyl radical containing from 3 to 6 carbon atoms, inclusive, such as propenyl, butenyl, pentenyl, hexenyl and isomeric forms thereof. The term "lower-aralkyl" as used throughout the specification and claims means an aralkyl radical containing from 7 to 13 carbon atoms, inclusive, such as benzyl, phenethyl, benzhydryl and the like. The term "lower-aryl" as used throughout the specification and claims means an aryl radical containing from 6 to 12 carbon atoms, inclusive, such as phenyl, tolyl, xylyl, naphthyl, biphenylyl, and the like.

The novel compounds of the invention possess useful properties. Illustratively, the compound diethyl 2-(2,4-dihydroxy-3,3-dimethylbutyramido)ethylphosphonate and the calcium salts of 2-(2,4-dihydroxy-3,3-dimethylbutyramido)ethylphosphonic acid and 2-(2,4-dihydroxy-3,3-dimethylvaleramido)ethylphosphonic acid exhibit activity as pantothenic acid antagonists in inhibiting the growth of Lactobacillus arabinosus, Lactobacillus casei and like lactic acid bacteria. The compounds of the invention are useful in producing pantothenic acid deficiency in laboratory animals to be used in the study of metabolic deficiency states. Said compounds are also useful in the detection and assay of organisms, of which they inhibit the growth, such as Lactobacillus arabinosus, Lactobacillus casei, and the like, and are particularly useful for the selective inhibition and/or assay of such organisms when present in association with organisms whose growth is unaffected by said compounds.

The novel compounds of the invention having the Formula I above in which $R_1$ has the significance hereinbefore defined and $R_2$ represents lower-alkyl, lower-alkenyl, lower-aralkyl or lower-aryl, can be prepared by reacting an hydroxy lactone having the formula

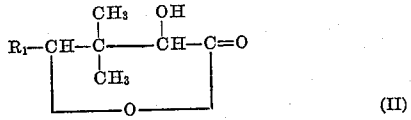

(II)

wherein $R_1$ has the significance hereinbefore defined, with an ester of 2-aminoethylphosphonic acid having the formula

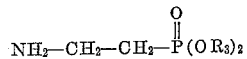

wherein $R_3$ is selected from the class consisting of lower-alkyl, lower-alkenyl, lower-aralkyl and lower-aryl. The ester of 2-aminoethylphosphonic acid can be employed in the form of an acid addition salt such as the hydrochloride, sulfate, and the like. In this case it is necessary to include in the reaction mixture a sufficient amount of a tertiary amine to liberate the free amino ester from the acid addition salt thereof. Suitable tertiary amines include pyridine, quinoline, isoquinoline, N-alkylpiperidines such as N-methylpiperidine, N-ethylpiperidine, N-isopropylpiperidine, and the like, N,N-dialkylanilines such as N,N-dimethylaniline, N,N-diethylaniline, and the like, and trialkylamines such as trimethylamine, triethylamine, triisopropylamine, and the like.

The reaction is preferably conducted in the presence of an inert solvent. Suitable solvents include the lower alkanols such as methanol, ethanol, isopropanol, and the like, liquid aliphatic polyhydroxy compounds such as ethylene glycol, propylene glycol, diethylene glycol, triethylene glycol, glycerol, and the like, and monoethers thereof such as methyl Carbitol, Carbitol, and butyl Carbitol (the methyl, ethyl, and butyl ethers, respectively, of diethylene glycol) and methyl Cellosolve, Cellosolve and butyl Cellosolve (the methyl, ethyl, and butyl ethers, respectively, of ethylene glycol).

The amount of phosphonate ester employed in the above reaction is advantageously at least equimolar with respect to the hydroxy lactone and preferably the phosphonate ester is employed in approximately twice the molar proportion.

The reaction can be conducted at ordinary temperatures, i.e., between about 20° C. and about 30° C., but a higher rate of reaction is achieved by conducting the reaction at a temperature of about 50° C. to about 100° C.

The desired product having the Formula I above can be isolated from the reaction mixture by procedures well-known in the art. For example, the reaction mixture can be evaporated to dryness and the residue purified by chromatography followed by distillation in vacuo.

The compounds of the invention having the Formula I above in which $R_1$ is as hereinbefore defined and $R_2$ represents a hydrogen atom, can be obtained by reacting a lactone having the Formula II above with an alkali metal salt or an alkaline earth metal salt of 2-aminoethylphosphonic acid in the presence of an inert solvent as hereinbefore defined. Preferably the proportions of reactants employed are approximately stoichiometric. The reaction is conducted advantageously at ordinary temperatures, i.e., between about 20° C. and about 30° C., but higher temperatures can be employed if desired. There is thus obtained a solution of an alkali metal salt or alkaline earth metal salt of the desired acid. The latter compound can be isolated either as the said salt or as the free acid by conventional procedures. For example, evaporation of the solution obtained in the above-described reaction yields the salt. The latter can be converted to the free acid by means known in the art, for example, by passage of an aqueous solution of the salt through a cation-exchange resin, for example, resins of the sulfonated styrene type, such as Dowex 50 (Dow Chemical Company), Permutit Q (Permutit Company), and Amberlite IR-120 (Rohm and Haas Company). The resulting solution of the desired free acid is then evaporated to dryness.

It will be appreciated that the lactones having the Formula II above can exist in racemic form or as one of the optically active isomers. When the racemic form of the lactone is employed in the process of the invention the compound having the Formula I obtained thereby will also be racemic. When an optically active isomer of a lactone having the Formula II is employed in the process of the invention the resulting compound having the formula I will also be optically active. Both the racemic and the optically active forms of the compounds having the Formula I are within the scope of the present invention.

The alkali metal and alkaline earth metal salts of the invention include the sodium, potassium, lithium, calcium and barium salts of the compounds having the Formula I above in which $R_1$ has the significance hereinbefore defined and $R_2$ represents a hydrogen atom. These salts can be prepared directly by reaction of a lactone having the Formula II above with the appropriate salt of 2-aminoethylphosphonic acid using the procedure described above. Alternatively the salts of the invention can be prepared from the corresponding free acids having the Formula I above in which $R_2$ is hydrogen, by treatment of the latter with a stoichiometric proportion of the appropriate alkali metal or alkaline earth metal hydroxide or carbonate.

The hydroxy lactones having the Formula II above, namely, pantolactone and 3,3-dimethyl-2-hydroxy-γ-valero-lactone, which are employed as starting materials in the processes of the invention are well-known. For example, see Stiller et al. J. Am. Chem. Soc., 62, 1785 (1940), and Drell et al., ibid., 70, 2057 (1948).

The esters of 2-aminoethylphosphonic acid having the formula

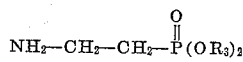

wherein $R_3$ has the significance hereinbefore defined, can be prepared by addition of ammonia to the appropriate ester of vinylphosphonic acid using the procedure described by Pudovik et al., Zhur. Obshchei Khim., 23, 263, 1953 [Chemical Abstracts, 48, 2573a, 1954] for the preparation of diethyl 2-aminoethylphosphonate. The esters of vinylphosphonic acid employed as intermediates in the latter reaction can be prepared by condensing the appropriate phosphite ester, $P(OR_3)_3$ wherein $R_3$ has the significance hereinbefore defined, with ethylene dibromide and treating the intermediate phosphonate ester, $BrCH_2CH_2P(OR_3)_2$ wherein $R_3$ has the significance hereinbefore defined, with potassium hydroxide according to the procedure described by Kosolapoff, J. Am. Chem. Soc. 70, 1971 (1948), for the preparation of diethyl vinylphosphonate.

The compound 2-aminoethylphosphonic acid which is employed as intermediate in the preparation of the compounds having the Formula I in which $R_2$ represents hydrogen, has been described by Kosolapoff, J. Am. Chem. Soc., 69, 2112 (1947).

The following examples are illustrative of the processes and products of the present invention, but are not to be construed as limiting.

EXAMPLE 1

2-pantamidoethylphosphonic acid [2-(2,4-dihydroxy-3,3-dimethylbutyramido)ethylphosphonic acid]

A solution was prepared by adding 1.76 g. of 24.6% (by weight) methanolic sodium methoxide solution [representing 0.43 g. (0.008 mole) of sodium methoxide] to 5 ml. of ethylene glycol. To the solution so obtained was added 0.5 g. (0.004 mole) of 2-aminoethylphosphonic acid (Kosolapoff, J. Am. Chem. Soc., 69, 2112, 1947). The mixture was shaken until solution was complete and the solution was treated with 0.52 g. (0.004 mole) of D(-)-pantolactone (Stiller et al., supra). The mixture was stirred at 25° C. for 18 hours and then poured into 200 ml. of acetone. The oily precipitate which separated was collected and dissolved in 100 ml. of water. The aqueous solution so obtained was passed through a column of 40 g. of Dowex 50 and the column was washed with 50 ml. of water. The combined effluents were lyophilized. There was thus obtained 2-pantamidoethylphosphonic acid in the form of an oil.

EXAMPLE 2

Barium hydrogen 2-pantamidoethylphosphonate

A solution of 0.5 g. of 2-pantamidoethylphosphonic acid (prepared as described in Example 1) in 50 ml. of water was treated carefully with 0.2 N aqueous barium hydroxide solution until the pH was 7.0. The resulting mixture was treated with an excess of gaseous carbon dioxide and the slight precipitate which formed was removed by filtration. The filtrate was lyophilized and the glassy material so obtained was dissolved in 50 ml. of methanol. The methanolic solution was clarified by centrifugation and poured into 75 ml. of acetone. The solid which separated was isolated by filtration and dried in vacuo. There was thus obtained 0.47 g. of barium hydrogen 2-pantamidoethylphosphonate in the form of an amorphous solid.

Analysis.—Calcd. for $C_{16}H_{34}BaN_2O_{12}P_2$: N, 4.34. Found: N, 3.97.

EXAMPLE 3

Calcium hydrogen 2-pantamidoethylphosphonic acid

A solution of 2-pantamidoethylphosphonic acid (prepared from 4 g. of 2-aminoethylphosphonic acid as described in Example 1) in a mixture of 50 ml. of methanol and 15 ml. of water, was treated with 3.0 g. of calcium hydroxide. The resulting mixture was filtered and the filtrate was concentrated under reduced pressure to give a thick syrup. The latter was dissolved in 20 ml. of methanol and the resulting solution was poured into 300 ml. of acetone. The solid which separated was isolated by filtration and dried in vacuo at 50° C. There was thus obtained 6.45 g. of calcium hydrogen 2-pantamidoethylphosphonate in the form of a white amorphous powder; $[\alpha]_D +19°$ (80% ethanol).

Analysis.—Calcd. for $C_{16}H_{34}CaN_2O_{12}P_2$: C, 35.04; H, 6.25. Found: C, 35.35; H, 6.98.

EXAMPLE 4

Diethyl 2-pantamidoethylphosphonate [diethyl 2-(2,4-dihydroxy-3,3-dimethylbutyramido)ethylphosphonate]

A mixture of 3.8 g. (0.017 mole) of diethyl 2-aminoethylphosphonate hydrochloride (Pudovik et al., supra.), 1.3 g. (0.01 mole) of D(-)pantolactone, 5 ml. of triethylamine and 20 ml. of methanol was heated under reflux for 24 hours. The reaction mixture was then evaporated to dryness. The residue was dissolved in methylene chloride and the solution was percolated through a column of 160 g. of Florisil (magnesium silicate). The column was eluted with a mixture of equal parts of Skellysolve B (mixture of hexanes) and acetone and the eluate was evaporated to dryness. The residue was dissolved in 100 ml. of acetone and the solution was treated with decolorizing charcoal. The mixture was filtered and the filtrate was evaporated to dryness. There was thus obtained diethyl 2-pantamidoethylphosphonate in the form of an oil; $n_D^{25}$ 1.5718, $[\alpha]_D +38°$ (ethanol).

Analysis.—Calcd. for $C_{12}H_{26}NO_6P$: C, 46.29; H, 8.42; P, 9.95. Found: C, 45.92; H, 8.37; P, 9.72.

EXAMPLE 5

Diphenyl 2-pantamidoethylphosphonate [diphenyl 2-(2,4-dihydroxy-3,3-dimethylbutyramido)ethylphosphonate]

Triphenyl phosphite (J. Am. Chem. Soc., 48, 1063, 1926) is condensed with ethylene dibromide and the diphenyl 2-bromoethylphosphonate so obtained is treated with potassium hydroxide according to the procedure described by Kosolapoff (J. Am. Chem. Soc. 70, 1971, 1948) to obtain diphenyl vinylphosphonate. The latter compound is then condensed with ammonia, using the procedure described by Pudovik et al., supra. to obtain diphenyl 2-aminoethylphosphonate.

Using the procedure described in Example 4, but substituting diphenyl 2-aminoethylphosphonate for diethyl 2-aminoethylphosphonate hydrochloride, there is obtained diphenyl 2-pantamidoethylphosphonate.

In similar manner but replacing triphenyl phosphite by triallyl phosphite, trimethallyl phosphite, tri-n-propyl phosphite, tri-n-butyl phosphite, tri-n-amyl phosphite and tribenzyl phosphite, there are obtained the corresponding 2-aminoethylphosphonates which are reacted, using the procedure described in Example 4, to give diallyl, dimethallyl, di-n-propyl, di-n-butyl, di-n-amyl, and dibenzyl 2-pantamidoethylphosphonates, respectively.

EXAMPLE 6

*2 - (2,4 - dihydroxy - 3,3 - dimethylvaleramido)ethylphosphonic acid and the calcium salt thereof*

A solution was prepared by adding 6.65 g. of 24.6% (by weight) methanolic sodium methoxide solution (representing 0.03 mole of sodium methoxide) to 10 ml. of ethylene glycol. To the solution so obtained was added 1.9 g. (0.015 mole) of 2-aminoethylphosphonic acid. The mixture was shaken until solution was complete and the solution was treated with 2.18 g. (0.015 mole) of 3,3-dimethyl-2-hydroxy-γ-valerolactone (Drell et al., supra). The mixture was stirred at 25° C. for 18 hours and then poured into 200 ml. of acetone. The oily precipitate which separated was collected and dissolved in 100 ml. of water. The aqueous solution so obtained was passed through a column of 40 g. of Dowex 50 and the column was washed with 50 ml. of water. The combined effluents were lyophilized. There was thus obtained 2 - (2,4 - dihydroxy - 3,3 - dimethylvaleramido)ethylphosphonic acid in the form of an oil. This acid was converted to its calcium salt by the procedure described in Example 3.

It is to be understood that the invention is not to be limited to the exact details of operation or exact compounds shown and described, as obvious modifications and equivalents will be apparent to one skilled in the art, and the invention is therefore to be limited only by the scope of the appended claims.

We claim:

1. A compound selected from the class consisting of (a) compounds having the formula:

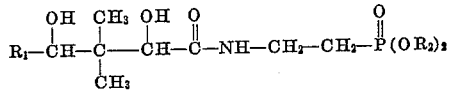

wherein $R_1$ is selected from the class consisting of hydrogen and methyl, and $R_2$ is selected from the class consisting of hydrogen, alkyl containing from 1 to 6 carbon atoms, inclusive, alkenyl containing from 3 to 6 carbon atoms, inclusive, aralkyl containing from 7 to 13 carbon atoms, inclusive, and aryl containing from 6 to 12 carbon atoms, inclusive, and (b) the alkali metal and alkaline earth metal salts of compounds having the above formula in which $R_2$ represents hydrogen.

2. 2 - (2,4 - dihydroxy - 3,3 - dimethylbutyramido)ethylphosphonic acid.

3. Diethyl 2 - (2,4 - dihydroxy-3,3 - dimethylbutyramido)ethylphosphonate.

4. Barium hydrogen 2-(2,4-dihydroxy-3,3-dimethylbutyramido)ethylphosphonate.

5. Calcium hydrogen 2-(2,4-dihydroxy-3,3-dimethylbutyramido)ethylphosphonate.

6. 2 - (2,4 - dihydroxy - 3,3 - dimethylvaleramido)ethylphosphonic acid.

7. Calcium hydrogen 2-(2,4-dihydroxy-3,3-dimethylvaleramido)ethylphosphonate.

References Cited in the file of this patent

UNITED STATES PATENTS

| | | |
|---|---|---|
| 2,328,358 | Pikl | Aug. 31, 1943 |
| 2,759,961 | Fitch | Aug. 21, 1956 |

OTHER REFERENCES

Textbook of Organic Chemistry, by Richter, 3rd ed., 1952, John Wiley & Sons, N.Y., pp. 340–341.